Feb. 26, 1924.                                              1,484,994
J. L. MAGUIRE ET AL
TIRE RETREADING CORE AND METHOD OF FORMING THE SAME
Filed July 19, 1922
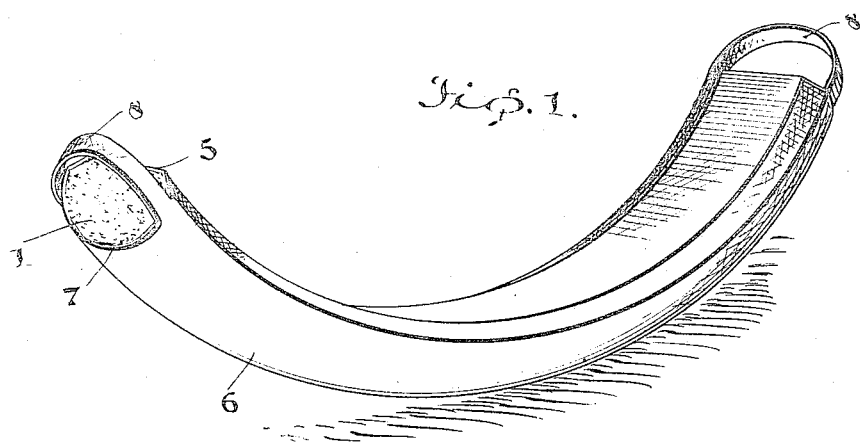
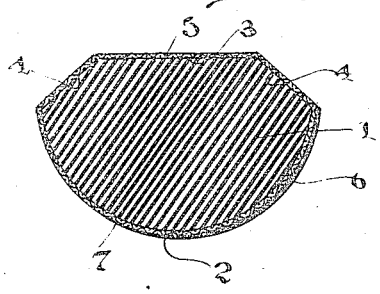
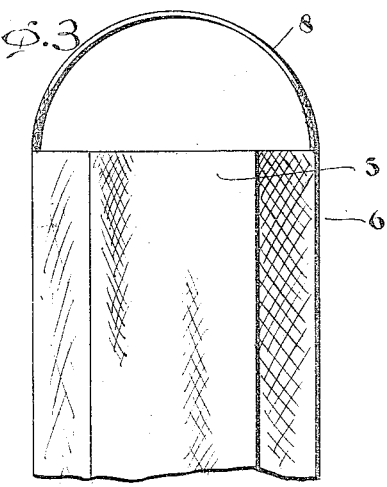
WITNESSES
INVENTORS
J. L. Maguire,
L. C. Weese,
ATTORNEYS Patented Feb. 26, 1924.

1,484,994

UNITED STATES PATENT OFFICE.

JOHN L. MAGUIRE AND LANTA C. WEESE, OF ELKINS, WEST VIRGINIA.

TIRE-RETREADING CORE AND METHOD OF FORMING THE SAME.

Application filed July 19, 1922. Serial No. 575,983.

*To all whom it may concern:*

Be it known that we, JOHN L. MAGUIRE and LANTA C. WEESE, citizens of the United States, and residents of Elkins, in the county of Randolph and State of West Virginia, have invented certain new and useful Improvements in Tire-Retreading Cores and Methods of Forming the Same, of which the following is a specification.

Our invention relates to devices which are adapted to be used in retreading automobile tires and it consists in the combinations, constructions and arrangements herein described and claimed.

An important object of our invention is to provide a simple, durable and inexpensive device which is adapted to be used in conjunction with ordinary "one-third circle" retread molds and the usual clamping devices associated with such molds to uniformly apply pressure against the inner wall of the portion of a tire that is being vulcanized.

Prior to our invention, pressure against the inner wall of a portion of an automobile tire being vulcanized in a mold of the character described has usually been applied through the agency of canvas bags or sleeves filled with sand. These have been unsatisfactory for commercial use for a number of reasons, among which are the following: The bags or sand containers are expensive and must be replaced after having been used a relatively few times, frequently bursting after having been used only one time.

When the sand containing bag or sleeve is placed in a tire, the sand naturally bunches at the lowest point and as a result the pressure applied against the portion of the tire being vulcanized is uneven and the tire is improperly vulcanized unless the vulcanizer takes the time to distribute the sand uniformly throughout the bag or container.

A device embodying our invention will last indefinitely in service and is adapted to be readily and conveniently adjusted in respect to a tire to exert pressure uniformly against the inner side of the portion of the tire being vulcanized. Moreover, a device embodying our invention if found to be too long for the most effective use with a portion of a tire of a given length can be adapted to the length of the portion of the tire to be vulcanized without detrimentally affecting the functioning of the device, whereas devices provided prior to our invention for applying pressure against the inner walls of portions of tires being vulcanized cannot be varied in length to meet varying service conditions or to compensate for imperfections in workmanship during the manufacture of such devices.

Other objects and advantages of our invention will be apparent from the following description, and the novel features of the invention will be particularly outlined in the appended claims.

A practical embodiment of our invention is illustrated in the accompanying drawings, forming a part of this application, in which—

Figure 1 is a perspective view of our improved core,

Figure 2 is an enlarged transverse section through the core, and

Figure 3 is an inner face view of a fragmentary portion of the core.

In carrying out our invention, we form by molding or by any other suitable known process of manufacture, an annular body made of a suitable compound or material which is tough, flexible, and adapted to withstand destructive forces of heat and pressure for a long time without any appreciable impairment, deformation, or distortion. We have found that a compound including a percentage of pure gum sufficiently great to make the compound tough and flexible, such as the ordinary commercial retread gum, is suitable for use in forming the body of a core embodying our invention. The outer peripheral wall of a body formed as described is arcuate in cross sectional contour to conform to the outer portion of the inner wall of an automobile tire. The inner wall of the body 1 is substantially flat along the longitudinal median line thereof and is merged at its edges by divergent or inclined edge portions into the outer peripheral wall. The curved outer wall of the body is indicated at 2 in the drawings, the flat inner wall of the body is indicated at 3 while the oppositely inclined inner edge portions of the body are designated at 4—4, being illustrated to advantage in Figure 2 of the drawings.

The flat inner wall of the body and the inclined edge portions 4—4 are covered with a facing of fabric 5 which is vulcanized to the body while the latter is in annular form. The annular body is then cut into a plurality of segmental arcuate sections, such as illustrated in Figure 1 and indicated generally at 6. Each of the sections 6 is approximately one-third of an annulus. The outer or curved face of each section is now covered with a facing 7 of fabric which is provided with loop or strap extensions at the ends thereof. The facing 7 is secured to the outer face of the body 1 through the use of a vulcanizing cement, whereby it will be vulcanized to the body when the section is used in the service for which intended, as will presently appear.

Each of the sections 6 constitutes a complete core and consequently it has not been deemed necessary to illustrate in the accompanying drawings the body 1 in annular form since it will be understood that three of the sections or cores 6 are formed from a single annular body and have the inner and outer and edge walls thereof covered with a suitable fabric, in the manner described.

From the foregoing description of the various parts of the device, the operation thereof may be readily understood. In actual practice, only about a one-third portion of a tire is vulcanized at one time and after such portion has been vulcanized in the retreading operation, it is necessary to shift the tire relatively to the mold in which held during the retreading operation and to move the core within the tire to apply pressure against an unvulcanized one-third portion thereof. The loop or strap portions 8—8 provide means whereby the core 6 can be conveniently moved in a tire. The flat portion and the inclined edge portion of the inner wall or face of the core do not engage with the inner peripheral portion of a tire being vulcanized in such manner as to retard or hinder free sliding movement of the core in the tire, as would be the case were the inner wall of the core rounded or of arcuate cross sectional contour. In the event that the core provided by our invention is slightly longer than the length of portions of the tire which are ordinarily vulcanized at one time, the end portions of the body of the core may be cut away until the core is of the length required to adapt it for use in applying pressure against the inner side of portions of a tire of a given length.

The core is made sufficiently long to adapt it for use with molds of ordinary length and can be adapted for use with shorter molds through the cutting off of the end portions of the body thereof in the manner described without severing the loops 8 from the core.

Obviously, our invention is susceptible of embodiment in forms other than that illustrated herein and we therefore consider as our own all modifications and adaptations of the form of the device herein disclosed which fairly fall within the scope of the appended claims.

We claim:—

1. The herein described method of forming cores for use in retreading tires which consists in forming a solid body of annular form, cutting the body into arcuate segmental sections, and attaching handle means to the ends of each section.

2. The herein described process of forming cores for use in retreading tires, which consists in providing an annular body of a tough, resilient and flexible material, and then cutting the body into a plurality of segmental sections of equal length.

3. The herein described method of forming cores for use in retreading tires which consists in providing an annular body made of a tough, flexible resilient material, covering the inner peripheral wall of the body with a protective facing of fabric, vulcanizing the fabric and the body into union with each other, cutting the resultant product into segmental sections, and securing a protective facing of fabric having strap portions at the ends thereof to the outer face of each section with a vulcanizing cement.

4. As an article of manufacture, a core for use in retreading tires comprising a solid body arcuate in form and made of a flexible resilient material, said body having concentric inner and outer walls, the outer wall thereof being arcuate in cross sectional contour and the inner wall thereof having a flat portion extending along the longitudinal median line thereof and oppositely inclined portions merging the flat portion into the outer wall, and a facing of fabric secured to the body and having loop portions at the ends thereof forming handles for the body.

JOHN L. MAGUIRE.
LANTA C. WEESE.